US011584279B2

(12) United States Patent
Ceglarek (10) Patent No.: US 11,584,279 B2
(45) Date of Patent: Feb. 21, 2023

(54) VALVE DEVICE AND VALVE SYSTEM EQUIPPED THEREWITH, AND CONTROL DEVICE CONTAINED THEREIN FOR FLUID FLOW CONTROL

(71) Applicant: Faurecia Autositze GmbH, Stadthagen (DE)

(72) Inventor: Piotr Ceglarek, Katowice (PL)

(73) Assignee: Faurecia Autositze GmbH, Stadthagen (DE)

( * ) Notice: Subject to any disclaimer, the term of this patent is extended or adjusted under 35 U.S.C. 154(b) by 138 days.

(21) Appl. No.: 17/147,816

(22) Filed: Jan. 13, 2021

(65) Prior Publication Data

US 2021/0261030 A1 Aug. 26, 2021

(30) Foreign Application Priority Data

Feb. 21, 2020 (DE) .......................... 102020104615.4

(51) Int. Cl.
*F16K 11/07* (2006.01)
*B60N 2/90* (2018.01)
*F16K 11/076* (2006.01)

(52) U.S. Cl.
CPC ............ *B60N 2/976* (2018.02); *F16K 11/076* (2013.01)

(58) Field of Classification Search
CPC ............................ B60N 2/976; F16K 11/076
See application file for complete search history.

(56) References Cited

U.S. PATENT DOCUMENTS

| 3,303,518 | A | | 2/1967 | Ingram | |
| 3,959,024 | A | | 5/1976 | Kirk | |
| 4,655,505 | A | * | 4/1987 | Kashiwamura | ........ B60N 2/914 297/284.6 |
| 5,678,265 | A | | 10/1997 | Meyer | |
| 2004/0020531 | A1 | * | 2/2004 | Bauer | ................. F15B 13/0402 137/106 |
| 2010/0317071 | A1 | * | 12/2010 | Hamelers | .................. C12P 7/04 435/161 |
| 2015/0375597 | A1 | * | 12/2015 | Callahan | ............ B60H 1/00264 62/3.61 |
| 2018/0317572 | A1 | * | 11/2018 | Guttman | .............. A41D 13/005 |

FOREIGN PATENT DOCUMENTS

WO 02065004 A1 8/2002

* cited by examiner

*Primary Examiner* — Kevin R Barss
(74) *Attorney, Agent, or Firm* — Laurence P. Colton; Smith Tempel Blaha LLC (57) ABSTRACT

A valve device for controlling a fluid flow, in particular an air flow, having at least one inlet and at least two outlets, at least one of the outlets being fluidically connectable in each case to the inlet via a through-channel of at least one manipulable guide means. The through-channel of the guide means can be changed at least indirectly via a control fluid flow either with regard to at least a section of its internal cross section or can be rotated at least to a limited extent with regard to its orientation with respect to the outlets and the inlet can be rotated at least to a limited extent.

11 Claims, 6 Drawing Sheets

VALVE DEVICE AND VALVE SYSTEM EQUIPPED THEREWITH, AND CONTROL DEVICE CONTAINED THEREIN FOR FLUID FLOW CONTROL

CROSS REFERENCE TO RELATED APPLICATIONS

This patent application claims the benefit of and priority on German Patent Application No. 10 2020 104 615.4 having a filing date of 21 Feb. 2020.

BACKGROUND OF THE INVENTION

Technical Field

The invention relates to a valve device for controlling a fluid flow, in particular air, comprising at least one inlet and at least two outlets, at least one of the outlets being fluidically connectable in each case to the inlet via a through-channel of at least one manipulable guide means.

The invention further relates to a valve system comprising at least two of these valve devices, in particular arranged in a housing, and to a control device comprising such a valve system for a function of a seat to be operated with fluid pressure, in particular pneumatically, comprising a valve system as described herein and a valve block with several valves, the outlets of which are each fluidically connected to an inlet of the valve devices of the valve system.

The invention also relates to a seating system comprising a seat with a functional device having a plurality of expansion bodies, in particular a massage device, and a control device as described herein, the valve system of which is fluidically connected to the functional device with the incorporation of hoses.

Prior Art

Seats used in vehicles, in particular, sometimes have at least one functional device that can be operated via a fluid pressure. The functions which are provided range, for example, from the ergonomic adaptability to the massage function of the seats. In addition to electrical actuators, hydraulically or pneumatically operated expansion bodies are also used for this. Such an expansion body, also referred to as a "bladder," comprises at least one hollow chamber that is as fluid-tight as possible, and the volume change of said chamber, based on filling and emptying, results in mechanical work. Because they only have a low moving mass due to their design, expansion bodies can be used to achieve fast and harmonic movements in addition to short reaction times.

The compressor used to build up the necessary fluid pressure can be placed, for example, in or outside the seat in such a way that the expansion body operates extremely quietly. They are mostly supplied by hoses fluidically connected to the compressor. These are usually each assigned to at least one valve, via which the targeted filling and emptying of the respective expansion body can be controlled. As the number of expansion bodies increases, the number of valves required to control them increases accordingly. For this purpose, the valves are typically combined to form a unit in the form of a valve block. With regard to the structure of such valves, those with a linearly displaceable piston (slide valve) or a piston that can be rotated about its longitudinal axis (rotary valve) are used as standard.

A valve device for a seat cushion which has a mat with a large number of inflatable expansion bodies is known from WO 02/065004 A1. The valve device comprises a housing with a cylindrical interior in which a guide means in the form of a piston is displaceably arranged. A channel which extends in the longitudinal direction of the piston is closed at the end by a stopper and is fluidically connected to openings arranged through the skirt of the piston, the piston being hollow in this respect. The housing has a plurality of outlets which are fluidically connected to the expansion bodies via channels formed in the mat. An inlet is arranged at a corner area of the mat, and through this inlet a fluid flow can be introduced into the expansion bodies that are fluidically connected to one another. By shifting of the piston longitudinally into a first position, the openings thereof can be connected to the outlets of the housing in such a way that the fluid flow which can be introduced via the inlet can be conveyed via the channel in the piston. In contrast, in a second position of the piston the connection can be broken appropriately. The piston is operated manually using the externally accessible stoppers.

Another seat cushion that has become known from U.S. Pat. No. 5,678,265 A has two chambers which are separate from one another and which can be filled with a fluid. A valve device with a guide means in the form of a rotary body, which has a through-channel, is incorporated between a compressor providing the fluid pressure and the seat cushion. The rotary body is rotatably arranged within a housing which has two outlets each fluidically connected to one of the chambers of the seat cushion via a hose. The through-channel of the rotary body is connected to a hose which is connected to the compressor. By manual rotation of the rotary body, each of the two outlets can be connected to the free end of the through-channel in order to introduce the fluid pressure that is present via the compressor through the through-channel of the rotary body and into one of the two chambers of the seat cushion.

Furthermore, U.S. Pat. No. 3,959,024 A discloses a slide valve which comprises a housing which is open on the longitudinal side and has a guide means in the form of a piston which is spring-loaded in one direction and is arranged longitudinally displaceably therein. The open longitudinal side of the housing is closed with a wall which has a large number of through openings. The piston has a total of three chambers separated from one another by partitions. In contrast, one of the through openings in the wall is designed as an inlet to which a fluid supply pressure can be applied. The through-openings in the wall immediately to the right and left of the inlet serve as distributor openings, while the remaining through-openings act as outlets at which an atmospheric pressure that is lower than the fluid supply pressure is applied. Because the position of the piston within the housing is variable via a rod connected to the piston, the inlet of the wall can be fluidically connected via a chamber of the piston to one of the two distributor openings of the wall, while at the same time the other distributor opening is fluidically connected via another chamber of the piston to one of the outlets of the wall. A side of the housing opposite the wall has a number of recesses adapted to the number of chambers of the piston, each recess being fluidically connected to one of the chambers via a channel arranged in the piston transversely to the longitudinal direction of the piston. Due to the structure and the prevailing pressure difference, the piston can be moved more easily.

U.S. Pat. No. 3,303,518 A shows an inflatable mattress which is divided into several separate zones. Each of these zones is connected to a hose through which a fluid flow can be introduced into or discharged from the associated zone. The control takes place via a box which is fluidically connected to the hoses, on the one hand, and to a compressor, on the other. The box has a large number of mechanical actuating buttons which are arranged in a lid of the box so that they can be moved longitudinally either by manual pressure or by turning in the sense of a screw. Each zone of the mattress is assigned a total of two of these actuating buttons, one of which is used for filling and the other for emptying the associated zone.

The manipulation of the respective fluid flow takes place via a change in the internal cross section of the hoses connected to a zone via the actuating buttons. The respective actuating button can assume a first position in which a section of the associated hose is completely squeezed and in this respect prevents a fluid flow through it. In contrast, the internal cross section of the respective hose is completely open in a second position of the associated actuating button, so that a fluid flow through it is made possible.

In particular, the separate control of functional devices having a plurality of expansion bodies in seats, such as a massage device with massage elements arranged in the seat part and back part of the seat, requires a large number of valves which are fluidically connected to the expansion bodies and which can be combined into one valve block per massage mat. With regard to each, for example, at least one printed circuit board with a valve block having a corresponding number of pneumatic or hydraulic and electronic components arranged thereon, such a control represents a correspondingly complex and thus expensive structure.

BRIEF SUMMARY OF THE INVENTION

The invention is based on the object of further developing a valve device provided for controlling a fluid flow and a valve system composed of a plurality of these valve devices as well as a control device with this valve system in such a way that they have an overall simpler and more cost-effective structure.

This object is achieved by a valve device for controlling a fluid flow, in particular an air flow, comprising at least one inlet and at least two outlets, at least one of the outlets being fluidically connectable in each case to the inlet via a through-channel of at least one manipulable guide means, characterized in that the through-channel of the guide means can be changed at least indirectly via a control fluid flow either with regard to at least a section of its internal cross section or can be rotated at least to a limited extent with regard to its orientation with respect to the outlets and the inlet can be rotated at least to a limited extent; by a valve system comprising at least two of the valve devices, in particular arranged in a housing; by a control device for a function of a seat to be operated with fluid pressure, in particular pneumatically, comprising a valve system as described herein and a valve block with several valves, the outlets of which are each fluidically connected to an inlet of the valve devices of the valve system; and by a seating comprising a seat with a functional device having a plurality of expansion bodies, in particular a massage device, and a control device as described herein, the valve system of which is fluidically connected to the functional device with the incorporation of hoses. Advantageous embodiments result from the respective dependent claims.

The valve device according to the invention for controlling a fluid flow comprises at least one inlet and at least two outlets, at least one of the outlets being fluidically connectable in each case to the inlet via a through-channel of at least one manipulable guide means. According to the invention, two alternative design options are proposed, of which a first variant provides that the through-channel of the guide means can be changed at least indirectly via a control fluid flow with respect to at least a section of its internal cross section. In other words, the inner cross section of the through-channel can for example be completely closed or, in contrast, can be opened, in that a control fluid flow acts at least indirectly on it.

A second variant of the embodiment according to the invention, on the other hand, provides that the through-channel of the guide means can be rotated at least to a limited extent, at least indirectly, via a control fluid flow with respect to its orientation with respect to the outlets and the inlet. In other words, the orientation of the through-channel with respect to the outlets and the inlet can be changed by at least a limited rotation, in that a control fluid flow acts at least indirectly thereon.

As can be seen, both design options are based on the use of a control fluid flow in order to manipulate the guide means by which the fluid flow to be regulated is directed to the valve device either with regard to the internal cross section or the orientation of the through-channel thereof.

The advantage resulting from this is to be seen in the fact that both alternative configurations enable an extremely simple and, in this respect, also cost-effective construction of the valve device. By elimination of the otherwise manual actuation of the valve device in favor of a control fluid flow, this device can be integrated into further systems in a variety of ways in order to be able to fulfill far more complex tasks.

With regard to electronic components, the valve device according to the invention would be comparable to a transistor, and because of the repeated and interconnected arrangement of this transistor entire circuits can also be constructed.

In particular, the configuration according to the first variant does not require any other customary piston, the longitudinally displaceable mounting of which requires correspondingly complex and therefore mostly expensive sealing measures.

In the context of the invention, the fluid flow to be conveyed and/or the control fluid flow can in principle be an air flow and thus can involve pneumatic applications.

According to a preferred development, in particular in relation to the first variant of the inventive concept, the guide means can be a hose section or can at least have a hose section.

The hose section should be designed to be elastic at least in some areas. Furthermore, a shut-off element which is placed or can be placed against an outer area of the hose section is provided, and can then be displaced relative to the hose section via the control fluid flow. In this way, the pressure of the control fluid flow can be converted into mechanical work that causes the shut-off element to be shifted. Naturally, the load from the shut-off element acts on the hose section in such a way that the through-channel thereof can be changed accordingly, for example completely closed, by an elastic change in shape. In this context, two extreme positions of the shut-off element are sufficient to obtain at least two states with respect to the through-channel in the hose section, namely an open or closed internal cross section. Complex sealing measures are not necessary for this, since the hose section itself is already completely tight. The mounting and/or guiding of the shut-off element also does not require any complex structure, since its task is merely to squeeze a section of the hose section, preferably completely. In this case the internal stress of the hose section can be sufficient so that when the shut-off element is pressureless the resulting restoring force of the hose section restores the shut-off element from the squeezed cross sectional shape back to its original shape, at least to a limited extent, while widening the inner cross section of the through-channel.

In order to increase the restoring force necessary for moving the shut-off element and/or to obtain a reliable widening of the through-channel, the shut-off element can also be arranged between a spring element and an expansion body which can be acted upon by the control fluid flow. In this case, the spring element supports the resetting of the shut-off element, which can be mounted in a linearly movable manner for this purpose. Of course, for this purpose a rotary mounting of the shut-off element is also conceivable, and for this purpose the shut-off element can, for example, have a projection on which the spring element, which is designed as a helical spring, can act. Alternatively, the spring element can also be designed as a torsion spring, so that the projection can be dispensed with. The expansion body ensures the targeted shifting of the shut-off element relative to the hose section, for example by translating its expanding shape into mechanical work due to the inflow of the control fluid flow, and thus acting upon the shut-off element. It would also be conceivable here to design the expansion body in the sense of a pneumatic or hydraulic muscle, so that two of its opposing ends approach one another, while the expansion body expands and thus shortens.

According to a further development of the valve device according to the invention, the hose section thereof can extend through between a part of the shut-off element and a counter-bearing that is fixed opposite it. As a result, the hose section can be squeezed in at least one section between the shut-off element and the counter-bearing as soon as an area of the shut-off element is moved relatively toward the counter-bearing.

According to a particularly preferred further development of the valve device according to the invention, it can have at least two hose sections arranged virtually next to one another, which can be changed in relation to the internal cross section of their respective through-channel via the control fluid flow. Each of these two hose sections is fluidically connected to only one of the outlets, on the one hand, and to the inlet, on the other. The connection of the two hose sections to the individual inlet takes place with the incorporation of a corresponding distributor element. For this purpose, this can have, for example, three connections fluidically connected to one another. By using two hose sections that are separate from one another, it is advantageously possible to close only one of these hose sections in relation to its through-channel by the shut-off element, while the other hose section has an open internal cross section and a through-channel that is continuous for the fluid flow. This allows alternating closure of either one or the other hose section in the sense of a 3/2-way valve by moving the shut-off element back and forth between two extreme positions.

Furthermore, the distributor element can have the inlet and two outlets fluidically connected to the inlet, each of these outlets then being fluidically connected to one of the two hose sections. The distributor element can also have a connecting channel which can be acted upon by the control fluid flow and which is then fluidically connected to an expansion body designed for at least indirect mechanical action on the through-channel of each hose section.

The invention provides that in each case one of the two hose sections is compressed with respect to the inner cross section of its through-channel via a spring-loaded shut-off element that is placed on the outer area of the hose section.

In other words, one of the hose sections is always blocked against the passage of an existing fluid flow. Only when the expansion body interacting with the shut-off element is acted upon by the control fluid flow can the compressed internal cross section of the through-channel of the hose section be opened by shifting of the shut-off element against the spring force. At the same time or with a time delay relative to this, the inner cross section of the through-channel of the other hose section can be at least partially reduced by the shut-off element then also acting on its outer area. In this way it is possible that only the through-channel of one hose section is open while the other remains closed.

According to a preferred further development, in particular with regard to the second variant of the inventive concept, the guide means can be a rotary body that can be rotated at least to a limited extent or can at least have such a rotary body. As a result of the rotation of the rotary body made possible via the control fluid flow, only one of the two outlets can be fluidically connected to the inlet. The rotation of the rotary body made possible via the control fluid flow can preferably take place against a spring loading, so that the rotary body rotates back into its starting position or at least in the direction of its starting position when the control fluid flow ceases.

In this connection, it is considered advantageous if the rotary body is rotatably arranged within a housing.

The inlet and the outlets can particularly preferably be arranged fixedly on the housing. In this way, hoses that can be fluidically connected to the inlet and the outlets in a fluid-conducting manner are not subjected to any mechanical stress, such as inevitably occurs, for example, in the form of bending when at least one hose is arranged directly on the rotatable rotary body.

The valve device according to the invention now presented enables extremely simple and inexpensive construction thereof. This has a positive effect in particular in connection with sometimes complex controls for fluid-operated functional devices, the number of expansion bodies to be controlled separately requiring a corresponding number of valves.

Furthermore, the invention is directed to a valve system which comprises at least two valve devices according to the invention. The valve system can provide a housing in which the valve devices are then arranged in the manner of a unit that is easy to handle and to connect.

Particularly preferably, all valve devices of the valve system can be arranged and/or connected or coupled in such a way that they can be manipulated at the same time by being acted upon by the control fluid flow. In this way, it is possible, as a function of a fluid flow present at at least one of the respective inlets of the valve devices, to convey fluid via one of the associated outlets of the valve devices manipulated via the control fluid flow. In this way, all valve devices can be switched at the same time via the control fluid flow, for example, to a connection between their inlet and a first of their outlets, this fluid flow being conveyed via the associated first outlet only as a function of at least one inlet of one of the valve devices being acted upon by a fluid flow. The control of much more complex devices can be achieved by appropriately controlled action upon the individual inlets of the valve devices. Due to the large number of valve devices, the valve system according to the invention represents a kind of valve multiplier.

The advantages resulting from the valve system according to the invention have already been explained in more detail in connection with the valve device according to the invention, so that, in order to avoid repetitions, reference is made at this point to the corresponding explanations.

The invention is also directed to a control device for a function of a seat to be operated with a fluid flow or fluid pressure. The seat can preferably be a vehicle seat. The control device comprises a valve system according to the invention as described above and a valve block with a plurality of valves. The outlets of the valve block are each fluidically connected to an inlet of the valve devices of the valve system.

The valve block can be a standard unit which, for example, has a printed circuit board with a number of preferably pneumatic or hydraulic and electronic components arranged thereon. Their individually controllable valves are each fluidically connected to the inlets of the valve devices of the valve system in such a way that at least one valve device can be acted upon by a fluid flow via an outlet of the valve block. Each valve device of the valve system can act, for example, as a 3/2-way valve which can be manipulated jointly via the control fluid flow. With a corresponding fluidic connection of the outlets of the individual valve devices of the valve system, the control device can also be used to control complex functional devices made up of two or more parts in a simple manner. In other words, the control option of an individual valve block can be duplicated and thus multiplied via the control device.

In this way, controls for multi-part functional devices can be implemented with only one valve block, which would otherwise require at least one valve block per part of the functional device. This is made possible by the incorporation of the control device according to the invention, and due to this incorporation a fluid flow conveyed via the outlet of a valve of the valve block can be conveyed, for example, either to a first part or a second part of a functional device.

Since the valve system of the control device according to the invention, which can be controlled via a single control fluid flow, has a simple and cost-effective structure, the costs are correspondingly lower compared to a classic structure with two or more valve blocks.

In addition, the invention is directed to a seating system which has a seat with at least one functional device having a plurality of individual expansion bodies and comprises a control device according to the invention. The seat can preferably be a vehicle seat or generally a seat in a vehicle, including, for example, a bench seat. The functional device can be a massage device, for example. As an alternative or in addition to this, the functional device can also be a multi-part lumbar support and/or side support(s) for the seat. In any case, the valve system of the control device according to the invention is fluidically connected to the functional device with hoses incorporated.

The advantages resulting from the seating system according to the invention have already been explained in more detail in connection with the valve device according to the invention and the control device according to the invention, so that in order to avoid repetition, reference is first made to the corresponding explanations at this point.

The functional device can advantageously have a first massage mat arranged in the area of a seat part of the seat and a second massage mat arranged in the area of a back part of the seat. At least one expansion body of the first massage mat and at least one expansion body of the second massage mat are each fluidically connected to different outlets of one of the valve devices of the valve system of the control device. In this way, via an outlet of the valve block, at an inlet, a valve device which is fluidically connected via its first outlet to an expansion body of the first massage mat and via its second outlet to an expansion body of the second massage mat, for example, can be introduced either into the expansion body of the first massage mat or into the expansion body of the second massage mat. Via a corresponding connection of all expansion bodies of the first and second massage mats to the outlets of the valve devices of the valve system of the control device, the fluid flows coming via the valve block can be alternately divided between individual expansion bodies of the two massage mats by all valve devices of the valve devices of the valve system of the control device being controlled or manipulated simultaneously via the control fluid flow.

BRIEF DESCRIPTION OF THE DRAWINGS

A design of a control device for a seat that can usually be implemented using the prior art is described below in relation to FIG. 1. The present invention will then be explained in more detail with the aid of some embodiments shown schematically in the further drawings. In the drawings.

DETAILED DESCRIPTION OF PREFERRED EMBODIMENTS

Figure 1:
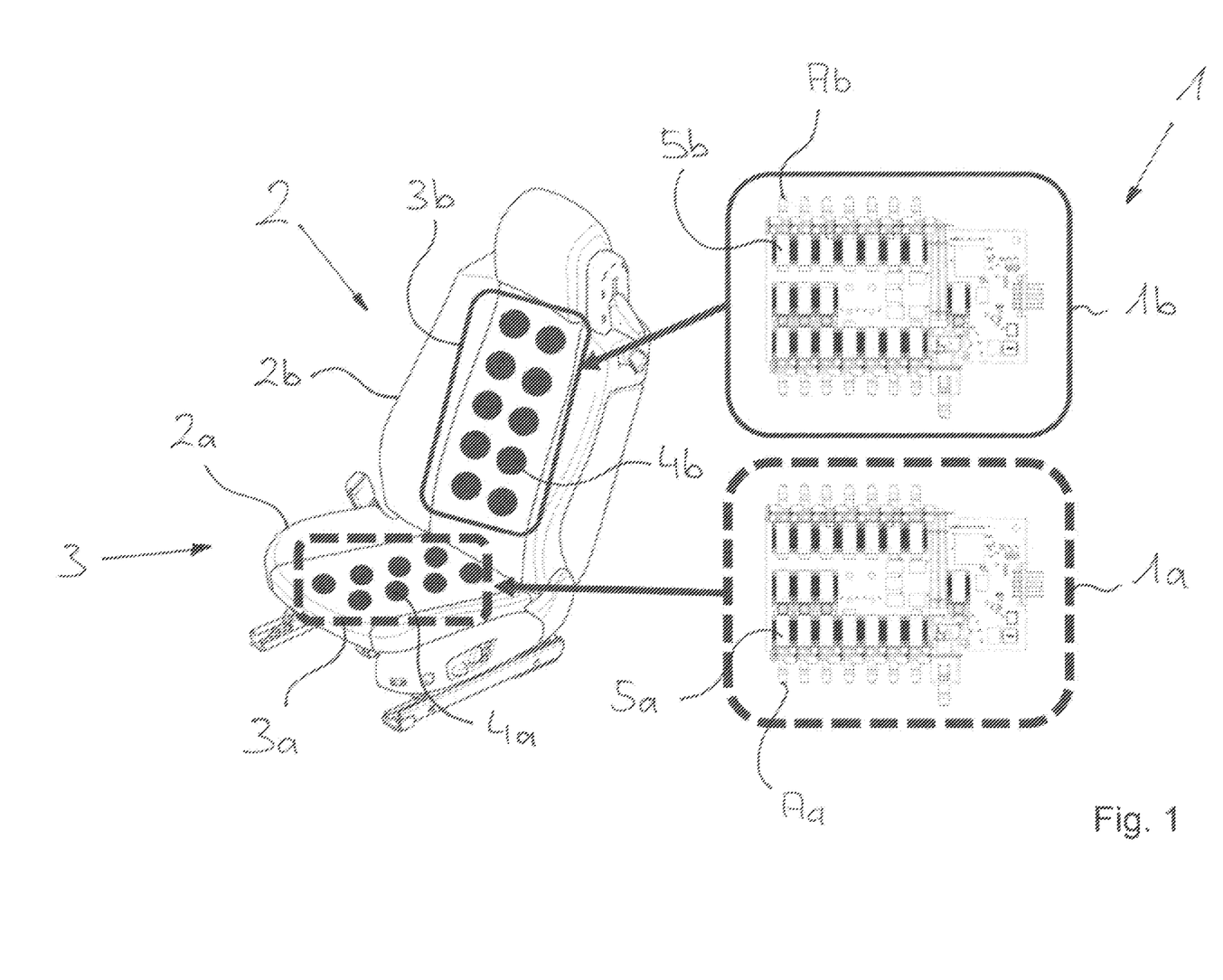

FIG. 1 shows an embodiment of a control device 1 for a seat 2 implemented using parts from the prior art. The seat 2 has a seat part 2a and a back part 2b arranged pivotably on the seat part 2a. Furthermore, the seat 2 also has a functional device 3 in the form of a massage device which comprises a first massage mat 3a arranged on the seat part 2a and a second massage mat 3b arranged on the back part 2b. Both massage mats 3a, 3b have a large number of expansion bodies 4a, 4b that can be filled with air, and which in the present case are only indicated by black dots without further detail.

The control device 1 comprises a first valve block 1a and a second valve block 1b, which are each assigned to one of the two massage mats 3a, 3b. Specifically, the first valve block 1a is connected to the first massage mat 3a on the seat part 2a of the seat 2, while the second valve block 1b is connected to the second massage mat 3b on the back part 2b of the seat 2. Without further detail, the respective expansion bodies 4a of the first massage mat 3a are fluidically connected to the first valve block 1a via hoses, not shown in detail, the expansion bodies 4b of the second massage mat 3b being fluidically connected to the second valve block 1b via hoses, also not shown in detail, (each indicated with a black arrow). For this purpose, each valve block 1a, 1b is equipped with individually controllable valves 5a, 5b, the associated outlets Aa, Ab of which are fluidically connected to the hoses in a manner not shown in detail.

The actual massage function of the functional device 3 is implemented in that the expansion bodies 4a of the first massage mat 3a are acted upon individually in a suitable manner by a fluid flow via the valves 5a and associated outlets Aa of the first valve block 1a in a suitable manner, while the expansion bodies 4b of the second massage mat 3b are acted upon individually in a suitable manner by a fluid flow via the valves 5b and associated outlets Ab of the second valve block 1b. In any case, two valve blocks 1a, 1b are necessary for this in order to control the parts of the functional device 3 appropriately.

Figure 2:
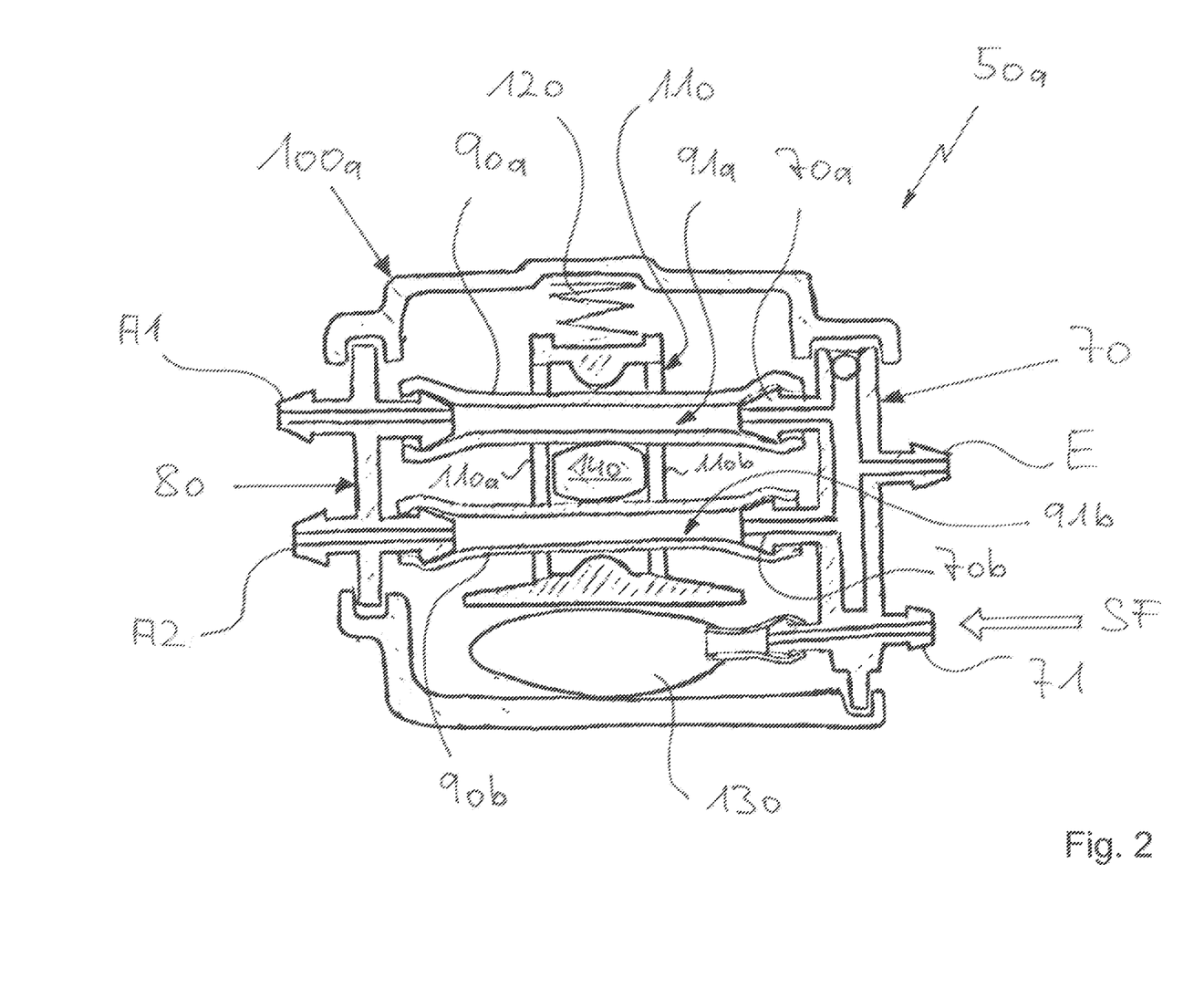
FIG. 2 shows a first embodiment of a valve device according to the invention in a sectional view.

FIG. 2 shows a first embodiment of a valve device 50a according to the invention which has an inlet E and, in the present case, two outlets A1, A2. The inlet E here is, purely by way of example, part of a distributor element 70 which, in addition to the inlet E, has two outlets 70a, 70b fluidically connected to it. Furthermore, a connection element 80 provided opposite the distributor element 70 has the two outlets A1, A2 which are separate from one another and extend through the connection element 80. Between the distributor element 70 and the connection element 80, two guide means extend in the form of hose sections 90a, 90b, of which a first hose section 90a is connected at the end, on the one hand, to an outlet 70a of the distributor element 70 and, on the other hand, to an outlet A1 of the connection element 80, while the second hose section 90b is connected at the end, on the one hand, to the other outlet 70b of the distributor element 70 and, on the other hand, to the other outlet A2 of the connection element 80. A through-channel 91a, 91b extends in each case through the hose sections 90a, 90b, so that in each case an outlet 70a, 70b is fluidically connected to an outlet A1, A2.

The distributor element 70 and the connection element 80 are surrounded by a housing 100a in which the two hose elements 90a, 90b extend parallel to one another. A shut-off element 110, which is arranged between a spring element 120 and an expansion body 130, is located within the housing 100a. The shut-off element 110, which can be linearly displaced between the spring element 120 and the expansion body 130, has two webs 110a, 110b spaced apart from one another, between which a counter-bearing 140 fixed on the housing 100a is arranged. It can be seen that the two hose sections 90a, 90b each extend between the counter-bearing 140 and a part of the shut-off element 110. With regard to the distributor element 70, it is clear that it has a connecting channel 71 which is fluidically connected to the expansion body 130.

Through the connecting channel 71, the expansion body 130 can be acted upon in a manner not shown in detail by a control fluid flow SF (indicated by a white arrow), and through the resulting expansion of the expansion body the shut-off element 110, which is at least partially adjacent to the expansion body 130, is linearly displaceable against the spring force of the spring element 120. As a result, a part of the shut-off element 110 approaches an outer area of the lower hose section 90b in FIG. 2, the elastic property of which allows its passage 91b to be closed by squeezing the hose section 90b between the shut-off element 110 and the counter-bearing 140. At the same time, the shut-off element 110 moves so far away from the other hose section 90a that its through-channel 91a is completely open with respect to its internal cross section. The expansion body 130 at least partially collapses due to a drop in the control fluid flow SF, so that the shut-off element 110 is linearly displaceable in the opposite direction, in particular due to the restoring force of the spring element 120.

As a result, the shut-off element now approaches the outer area of the upper hose section 90a in FIG. 2 and, as it does so, said area of said hose section is squeezed between the shut-off element and the counter-bearing 140, so that the through-channel 91a thereof is now closed with respect to its inner cross section. At the same time, the through-channel 91b of the other hose section 90b is cleared. Due to the force from the spring element 120, this position is maintained until the shut-off element 110 can again be linearly displaced from its position by application of the control fluid flow SF.

Figure 3:
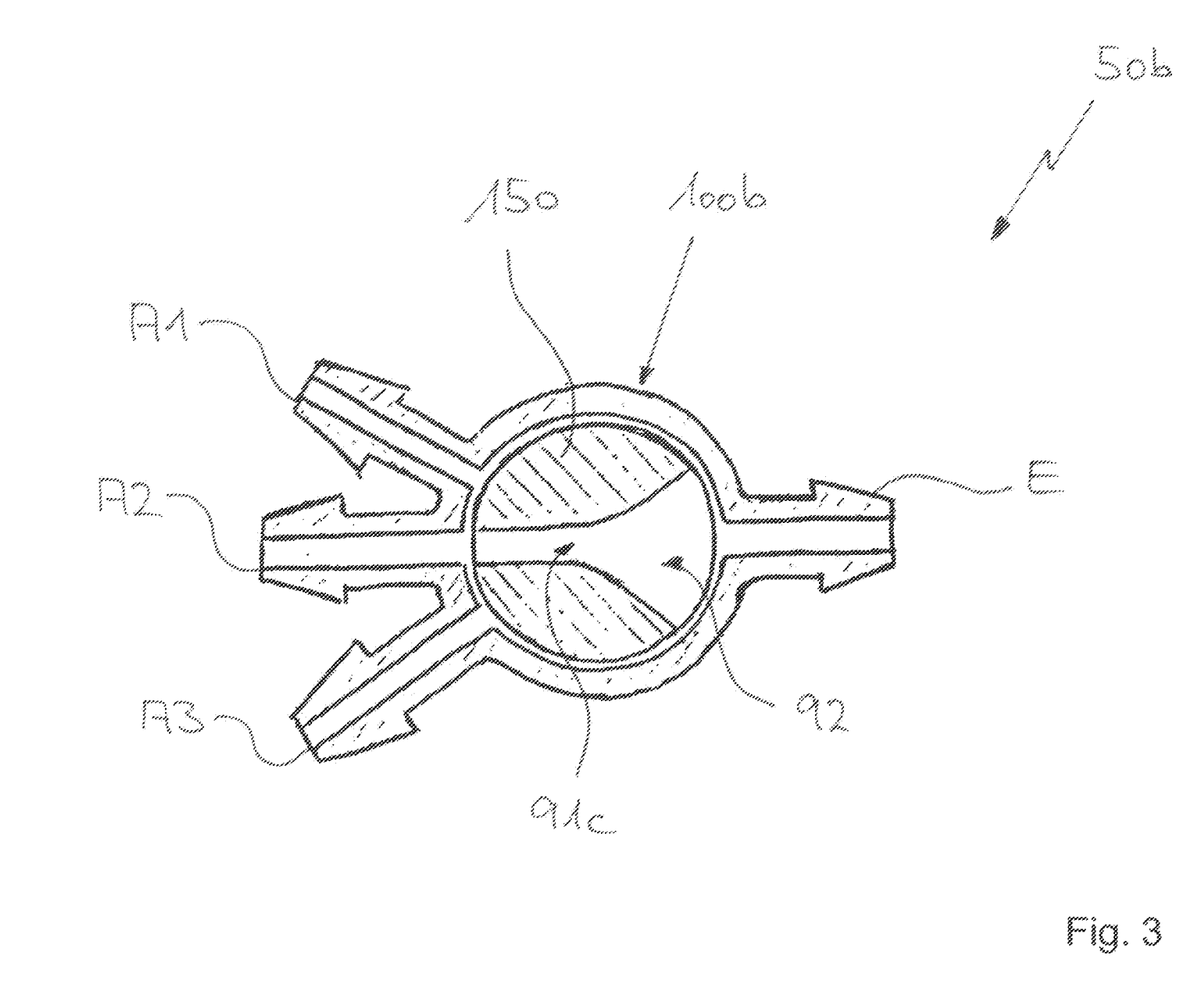
FIG. 3 shows a second alternative embodiment of the valve device according to the invention in a sectional view.

FIG. 3 shows an alternative embodiment of the valve device 50a according to the invention from FIG. 2 in the form of a further valve device 50b, the guide means of which is not designed as at least one hose portion 90a, 90b, but as a rotary body 150. The rotary body 150 is arranged within a housing 100b so that it can rotate at least to a limited extent. The housing 100b has an inlet E and, in the present case—purely by way of example—a total of three outlets A1-A3, all of which are fixedly arranged on the housing 100b. In this embodiment, the outlets A1-A3 and the inlet E can be an integral part of the housing 100b made of the same material. It can be seen that the rotary body 150 has a through-channel 91c, the orientation of which relative to the outlets A1-A3 and the inlet E can be correspondingly rotated by rotating the rotary body 150. In this case, an end section facing the inlet E has a widening 92 which opens toward the inlet E and is designed in such a way that a fluid flow flowing in via the inlet E in all sensible orientations of the rotary body 150 with respect to the outlets A1-A3 can always flow into its through-channel 91c and can flow out via one of the outlets A1-A3.

The control of the rotary body 150 with regard to its rotatability within the housing 100b takes place in a manner not shown in detail via a control fluid flow SF. Thus, for example, the rotary body 150 can be spring-loaded, as a result of which the through-channel 91c of which is always aligned with one of the outlets A1-A3 in a basic position. For example, depending on the pressure of the control fluid flow SF, the rotary body 150 can then be rotatable in a further orientation toward one of the other outlets A1-A3, the rotary body 150 being rotated back into its basic position after the pressure has dropped.

Figure 4:
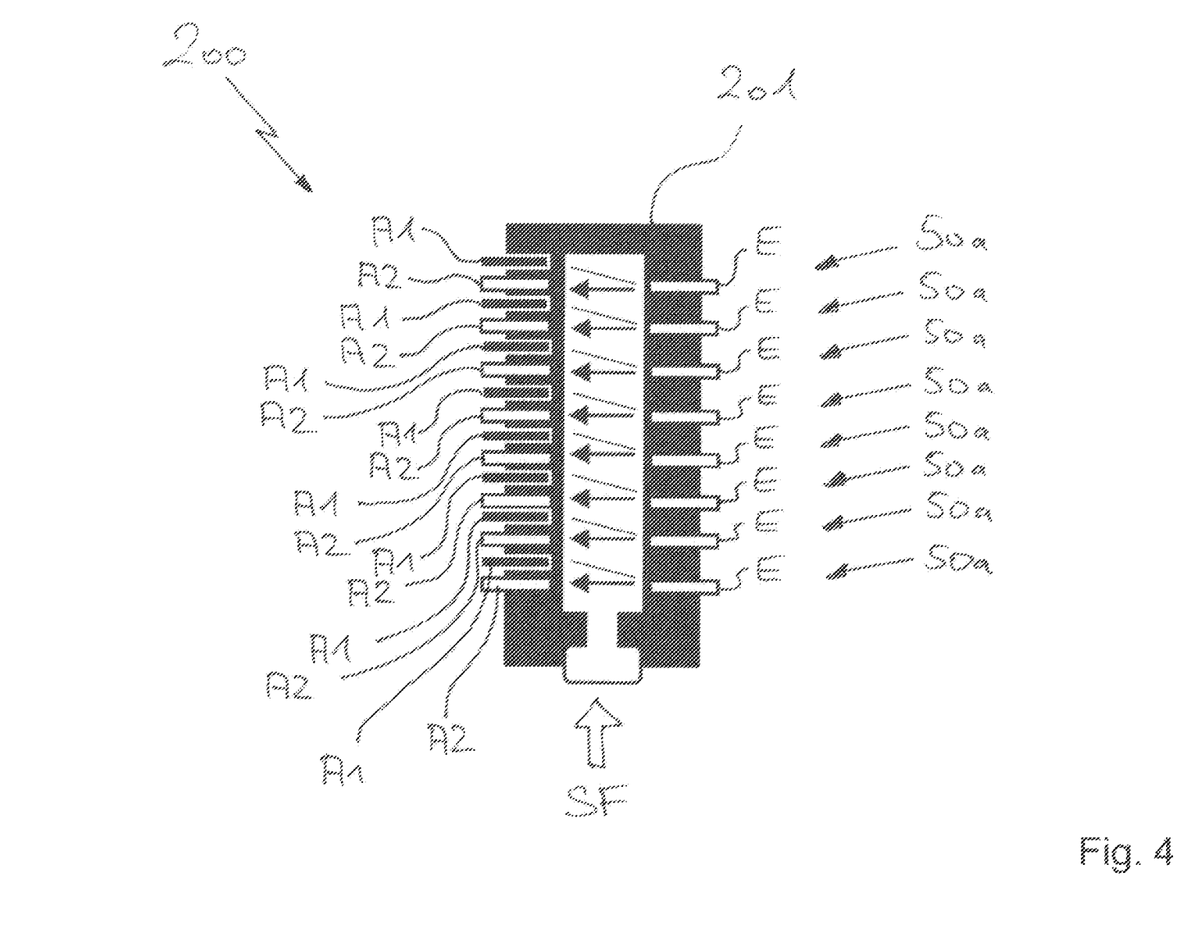
FIG. 4 shows a valve system according to the invention in a top view.

FIG. 4 illustrates the possible structure of a valve system 200 according to the invention, which in the present case—purely by way of example—comprises a total of eight of the valve devices 50a, 50b according to the invention. The valve devices 50a, 50b can always have the same configuration or can have a combination, not shown in detail, of at least one valve device 50a of the first embodiment with at least one valve device 50b of the second embodiment. In the present case, the valve system 200 comprises—purely by way of example—a total of eight valve devices 50a of the first embodiment. These can be connected to one another in a suitable manner, such as by an arrangement on or inside a housing 201. The valve devices 50a are combined with one another in a manner not shown in greater detail in such a way that they can all be manipulated at the same time by the action of the control fluid flow SF thereon.

In other words, the application of the control fluid flow SF, for example at a central point of the valve system 200 (indicated by a white arrow), is sufficient in order to switch the valve devices 50a with regard to the possible conveying of a fluid flow present at their respective inlet E from one of their outlets A1, A2 to the respective other outlet A1, A2.

Figure 5:
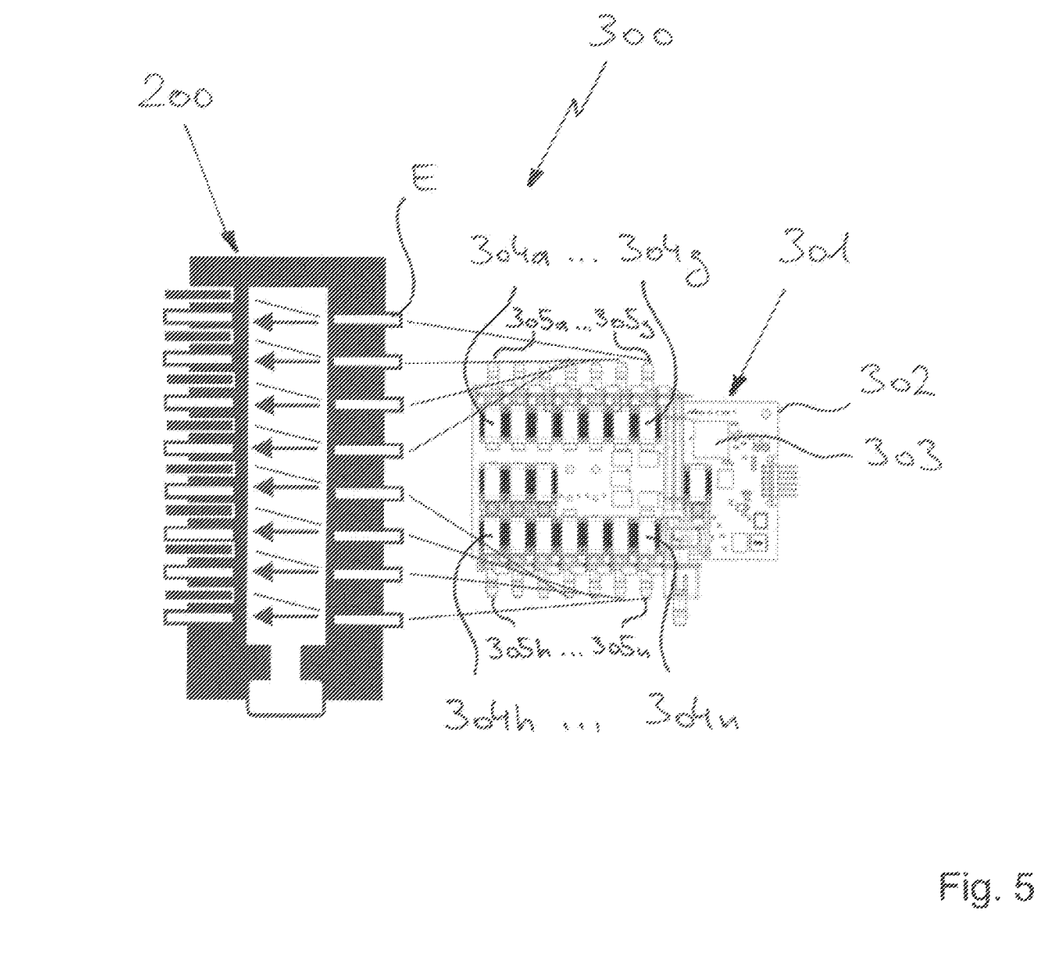
FIG. 5 shows a control device according to the invention in a top view.

FIG. 5 shows a control device 300 according to the invention, which comprises the valve system 200 from FIG. 4 and a valve block 301. The valve block 301 has a printed circuit board 302 on which electronic components 303 and pneumatic or hydraulic components in the form of valves 304a-304n are arranged. The outlets 305a-305n thereof are each fluidically connected to an inlet E of the valve devices 50a, 50b of the valve system 200 (indicated by black lines). The valve system 200 acts as a type of valve multiplier, since each fluid flow that can be guided via an outlet 305a-305n of the control device can be conveyed in each case by one of the outlets A1-A3 of the valve devices 50a, 50b.

Figure 6:
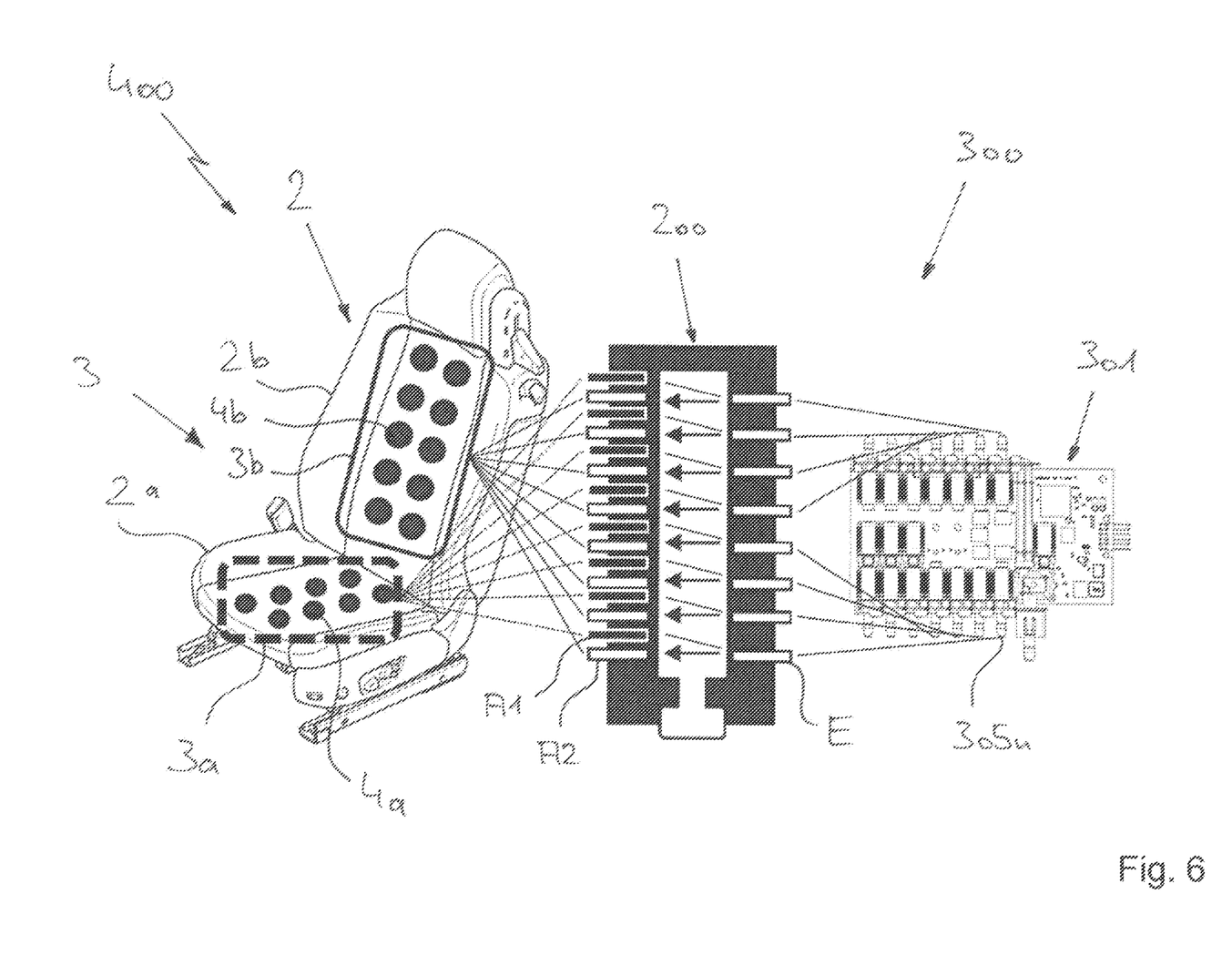
FIG. 6 shows a seat according to the invention with a control device according to the invention.

FIG. 6 shows a seating system 400 according to the invention with a seat 2, the structure of which corresponds to the vehicle seat 2 from FIG. 1 with regard to its seat part 2a and its back part 2b together with the functional device 3. Here, too, a massage mat 3a is arranged on the seat part 2a and a massage mat 3b is arranged on the back part 2b of the seat 2. The seating system 400 further comprises the control device 300 according to the invention, which has the valve system 200 according to the invention and—in contrast to the embodiment in the prior art according to FIG. 1—has only one single valve block 301.

The individual outlets A1-A3 of the valve devices 50a, 50b of the valve system 200 can be seen to be fluidically connected to the expansion bodies 4a, 4b of the two massage mats 3a, 3b of the functional device 3 (indicated by black continuous and broken lines). In this way, it is possible to convey a fluid flow present, for example, via the outlet 305n of the valve block 301 at the inlet E of a valve device 50a of the valve system 200 via one of the outlets A1, A2 of the associated valve device 50a. The first outlet A1 is fluidically connected, for example, to an expansion body 4a of the massage mat 3a arranged on the seat part 2a, while the other outlet A2 is fluidically connected to an expansion body 4b of the massage mat 3b arranged on the back part 2b. In this way, the valve system 200 acts as a type of valve multiplier for the valve block 301, since its one fluid flow can now be passed alternately to an expansion body 4a, 4b of the two massage mats 3a, 3b. In spite of the separate control of two massage mats 3a, 3b, only a single valve block 301 is required.

The functional device here includes pneumatic massage mats in the seat part and backrest only by way of example. The functional device can also be a means for pneumatic contour adjustment of the side panels in the seat part and backrest or any other pneumatic adjustment in the interior of a vehicle, for example a lumbar support, a headrest, an armrest or a seat depth adjustment.

LIST OF REFERENCE SIGNS

1—control device
1a—first valve block of 1
1b—second valve block of 1
2—seat
2a—seat part of 2
2b—back part of 2
3—functional device of 2
3a—first massage mat of 3
3b—second massage mat from 3
4a—expansion body of 3a
4b—expansion body of 3b
5a—valve of 1a
5b—valve of 1b
50a—valve device
50b—valve device
70—distribution element of 50a
70a—outlet of 70
70b—outlet of 70
71—connecting channel of 50a
80—connection element of 50a
90a—first hose section of 50a
90b—second hose section of 50a
91a—through-channel of 90a
91b—through-channel of 90b
91c—through-channel of 150
92—widening of 150
100a—housing of 50a
100b—housing of 50b
110—shut-off element of 50a
110a—web of 110
110b—web of 110
120—spring element of 50a
130—expansion body of 50a
140—counter-bearing of 50a
150—rotating body of 50b
200—valve system
201—housing of 200
300—control device
301—valve block of 300
302—printed circuit board of 301
303—electronic component of 301
304a—valve of 301
304b—valve of 301
304c—valve of 301
304d—valve of 301
304e—valve of 301
304f—valve of 301
304g—valve of 301
304h—valve of 301
304i—valve of 301
304j—valve of 301
304k—valve of 301
304l—valve of 301
304m—valve of 301
304n—valve of 301
305a—outlet of 304a
305b—outlet of 304b
305c—outlet of 304c
305d—outlet of 304d
305e—outlet of 304e
305f—outlet of 304f
305g—outlet of 304g
305h—outlet of 304h
305i—outlet of 304i
305j—outlet of 304j
305k—outlet of 304k
305l—outlet of 304l
305m—outlet of 304m
305n—outlet of 304n
400—seating system
Aa—outlet of 5a
Ab—outlet of 5b
A1—outlet of 50a or 50b
A2—outlet of 50a or 50b
A3—outlet from 50b
E—inlet of 50a or 50b
SF—control fluid flow

What is claimed is:

1. A valve device (50a, 50b) for controlling a fluid flow, in particular an air flow, comprising at least one inlet (E) and at least two outlets (A1-A3), at least one of the outlets (A1-A3) being fluidically connectable in each case to the inlet (E) via a through-channel (91a-91c) of at least one manipulable guide means, wherein the through-channel (91a-91c) of the guide means is changeable at least indirectly via a control fluid flow (SF) either with regard to at least a section of its internal cross section or is rotatable at least to a limited extent with regard to its orientation with respect to the outlets (A1-A3) and the inlet (E) is rotatable at least to a limited extent, wherein the guide means is or has a hose section (90a, 90b) that is elastic at least in some areas, with a shut-off element (110) which is or can be applied to an outer area of the hose section (90a, 90b) and which is provided via the control fluid flow (SF) is displaceable relative to the hose section (90a, 90b).

2. The valve device (50a, 50b) according to claim 1, wherein the shut-off element (110) is arranged between a spring element (120) and an expansion body (130) that can be acted upon by the control fluid flow (SF), in particular in a linearly movable manner.

3. The valve device (50a, 50b) according to claim 1, wherein the hose section (90a, 90b) extends between a part of the shut-off element (110) and a counter-bearing (140) which is fixed opposite it.

4. A valve device (50a, 50b) for controlling a fluid flow, in particular an air flow, comprising at least one inlet (E) and at least two outlets (A1-A3), at least one of the outlets (A1-A3) being fluidically connectable in each case to the inlet (E) via a through-channel (91a-91c) of at least one manipulable guide means, wherein the through-channel (91a-91c) of the guide means is changeable at least indirectly via a control fluid flow (SF) either with regard to at least a section of its internal cross section or is rotatable at least to a limited extent with regard to its orientation with respect to the outlets (A1-A3) and the inlet (E) is rotatable at least to a limited extent, wherein at least two hose sections (90a, 90b) are provided which can be changed with regard to the inner cross section of their respective through-channel (91a, 91b) via the control fluid flow (SF), each of these hose sections (90a, 90b) being fluidically connected to only one outlet (A1, A2) and, with the incorporation of a distributor element (70), to the inlet (E).

5. The valve device (50a, 50b) according to claim 4, wherein the distributor element (70) has the inlet (E) and two outlets (70a, 70b) fluidically connected to the inlet (E), which are each connected to one of the hose sections (90a, 90b), the distributor element (70) having a connecting channel (71) which can be acted upon by the control fluid flow (SF) and is fluidically connected to an expansion body (130) designed for at least indirect mechanical action on the through-channel (91a, 91b) of each hose section (90a, 90b).

6. The valve device (50a, 50b) according to claim 5, wherein in each case one of the hose sections (90a, 90b) is compressed via a spring-loaded shut-off element (110) applied to its outer area with respect to the internal cross section of its through-channel (91a, 91b), wherein by action of the expansion body (130) with the control fluid flow (SF) interacting with the shut-off element (110) the internal cross section of the compressed inner channel (91a, 91b) of one hose section (90a, 90b) can be opened by shifting the shut-off element (110) against the spring force, and the internal cross section of the through-channel (91a, 91b) of the other hose section (90a, 90b) can be at least partially reduced by the shut-off element (110) acting on its outer area, in particular at the same time.

7. A valve device (50a, 50b) for controlling a fluid flow, in particular an air flow, comprising at least one inlet (E) and at least two outlets (A1-A3), at least one of the outlets (A1-A3) being fluidically connectable in each case to the inlet (E) via a through-channel (91a-91c) of at least one manipulable guide means, wherein the through-channel (91a-91c) of the guide means is changeable at least indirectly via a control fluid flow (SF) either with regard to at least a section of its internal cross section or is rotatable at least to a limited extent with regard to its orientation with respect to the outlets (A1-A3) and the inlet (E) is rotatable at least to a limited extent, wherein the guide means is or has a rotary body (150) which is rotatable at least to a limited extent, and in each case only one of the outlets (A1-A3) can be fluidically connected to the inlet (E) by a possible rotation of the rotary body (150) via the control fluid flow (SF), in particular against a spring loading.

8. The valve device (50b) according to claim 7, wherein the rotary body (150) is arranged rotatably within a housing (100b), the inlet (E) and the outlets (A1-A3) being fixedly arranged on the housing (100b).

9. A valve system (200), comprising at least two valve devices (50a, 50b), in particular arranged in a housing (201), wherein the valve devices (50a, 50b) comprise at least one inlet (E) and at least two outlets (A1-A3), at least one of the outlets (A1-A3) being fluidically connectable in each case to the inlet (E) via a through-channel (91a-91c) of at least one manipulable guide means, wherein the through-channel (91a-91c) of the guide means is changeable at least indirectly via a control fluid flow (SF) either with regard to at least a section of its internal cross section or is rotatable at least to a limited extent with regard to its orientation with respect to the outlets (A1-A3) and the inlet (E) is rotatable at least to a limited extent, wherein all of the valve devices (50a, 50b) are manipulable at the same time by being acted upon by the control fluid flow (SF).

10. A seating system (400), comprising a seat (2) with a functional device (3) having a plurality of expansion bodies (4a, 4b), in particular a massage device, and a control device (300), the valve system (200) of which is fluidically connected to the functional device (3, 30) with the incorporation of hoses, wherein the control device (300) comprises a valve system (200) and a valve block (301) with several valves (304a-304n), outlets (305a-305n) of which are each fluidically connected to an inlet (E) of the valve devices (50a, 50b) of the valve system (200), wherein the valve system (200) comprises at least two valve devices (50a, 50b), in particular arranged in a housing (201), wherein the valve devices (50a, 50b) comprise at least one inlet (E) and at least two outlets (A1-A3), at least one of the outlets (A1-A3) being fluidically connectable in each case to the inlet (E) via a through-channel (91a-91c) of at least one manipulable guide means, wherein the through-channel (91a-91c) of the guide means is changeable at least indirectly via a control fluid flow (SF) either with regard to at least a section of its internal cross section or is rotatable at least to a limited extent with regard to its orientation with respect to the outlets (A1-A3) and the inlet (E) is rotatable at least to a limited extent, wherein the functional device (3) has a first massage mat (3a) arranged in the area of a seat part (2a) and a second massage mat (3b) arranged in the area of a back part (2b), at least one expansion body (4a) of the first massage mat (3a) and at least one expansion body (4b) of the second massage mat (3b) being fluidically connected to outlets (A1-A3), which are different from one another, of a valve device (50a, 50b) of the valve system (200).

11. The seating system (400) according to claim 10, as a vehicle seat.

* * * * *